(12) United States Patent
Jung et al.

(10) Patent No.: US 8,976,805 B2
(45) Date of Patent: Mar. 10, 2015

(54) METHOD FOR COMMUNICATING WITH DATA THROUGH COMPONENT CARRIERS IN MOBILE COMMUNICATION SYSTEM TO WHICH CARRIER AGGREGATION METHOD IS APPLIED AND APPARATUS THEREFOR

(71) Applicant: LG Electronics Inc., Seoul (KR)

(72) Inventors: Sung Hoon Jung, Anyang-si (KR); Sung Duck Chun, Anyang-si (KR); Seung June Yi, Anyang-si (KR); Young Dae Lee, Anyang-si (KR); Sung Jun Park, Anyang-si (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 14/106,562

(22) Filed: Dec. 13, 2013

(65) Prior Publication Data

US 2014/0160985 A1 Jun. 12, 2014

Related U.S. Application Data

(63) Continuation of application No. 13/521,409, filed as application No. PCT/KR2011/000167 on Jan. 11, 2011, now Pat. No. 8,705,478.

(60) Provisional application No. 61/294,088, filed on Jan. 11, 2010, provisional application No. 61/304,770, filed on Feb. 15, 2010.

(51) Int. Cl.
  *H04W 40/02* (2009.01)
  *H04L 5/00* (2006.01)
  *H04W 72/04* (2009.01)

(52) U.S. Cl.
  CPC .............. *H04W 40/02* (2013.01); *H04L 5/001* (2013.01); *H04L 5/003* (2013.01); *H04W 72/0406* (2013.01); *H04L 5/0007* (2013.01)
  USPC ........................................................ 370/431

(58) Field of Classification Search
  None
  See application file for complete search history.

(56) References Cited

U.S. PATENT DOCUMENTS

| 8,531,966 B1 | 9/2013 | Dinan |
| 2008/0287068 A1 | 11/2008 | Etemad |

(Continued)

FOREIGN PATENT DOCUMENTS

| CN | 101547477 A | 9/2009 |
| CN | 101600245 A | 12/2009 |

(Continued)

OTHER PUBLICATIONS

LG Electronics, "Consideration on DL/UL CC linkage for physical channel transmission", 3GPP TSG RAN WG1 #58bis, Miyazaki, Japan, Oct. 12-16, 2009, R1-094169.

(Continued)

*Primary Examiner* — Kerri Rose
(74) *Attorney, Agent, or Firm* — McKenna Long & Aldridge LLP

(57) ABSTRACT

The present invention relates to a method for enabling a terminal to communicate with data by modifying an association relationship among component carriers in a mobile communication system supporting carrier aggregation and an apparatus therefor. The method in accordance with one embodiment of the present invention, comprises: receiving a message including identifier information for modifying an association relationship among at least one downlink component carrier and at least one uplink component carrier from a base station; receiving predetermined data through at least one downlink component carrier from the base station; and transmitting feedback data to the base station for data received through the uplink component carrier modified according to the identifier information.

10 Claims, 15 Drawing Sheets

Previous CC connection configuration → Modified CC connection configuration

(56) References Cited

U.S. PATENT DOCUMENTS

2010/0296389 A1* 11/2010 Khandekar et al.
2011/0158089 A1   6/2011 Sambhwani et al.
2012/0113939 A1   5/2012 Kim et al.
2012/0300701 A1  11/2012 Uemura et al.

FOREIGN PATENT DOCUMENTS

| CN | 101615992 A | 12/2009 |
| RU | 2359412 | 6/2009 |
| WO | 2007/056630 | 5/2007 |
| WO | 2008/042889 | 4/2008 |
| WO | 2008/055235 | 5/2008 |
| WO | 2009/020423 | 2/2009 |
| WO | 2009/046061 | 4/2009 |
| WO | 2009/101581 | 8/2009 |

OTHER PUBLICATIONS

LG Electronics, "Discussion on CC linkage", 3GPP TSG-RAN2 Meeting #69bis, Beijing, China, Apr. 12-16, 2010, R2-102242.

HT mMobile Inc., "Discussion on DL/UL CC linkage for carrier aggregation", 3GPP TSG RAN WG2 Meeting #68bis, Jan. 18-22, 2010, Valencia, Spain, R2-100573.

Zte, "On DL component carrier ambiguity in initial random access procedure", 3GPP TSG RAN WG2 Meeting #67, Shenzhen, China, Aug. 24-28, 2009, R2-094719.

3GPP TSG RAN WG1 #58bis, R1-094169, 20091016, LG Electronics, Consideration on DL/UL CC linkage for physical channel transmission.

* cited by examiner

Previous CC connection configuration    Modified CC connection configuration

Previous CC connection configuration    Modified CC connection configuration

Previous CC connection configuration    Modified CC connection configuration

Previous CC connection configuration    Modified CC connection configuration

Previous CC connection configuration    Modified CC connection configuration

Previous CC connection configuration     Modified CC connection configuration

Previous CC connection configuration     Modified CC connection configuration

Previous CC connection configuration    Modified CC connection configuration

Previous CC connection configuration    Modified CC connection configuration

Previous CC connection configuration        Modified CC connection configuration Previous CC connection configuration        Modified CC connection configuration

METHOD FOR COMMUNICATING WITH DATA THROUGH COMPONENT CARRIERS IN MOBILE COMMUNICATION SYSTEM TO WHICH CARRIER AGGREGATION METHOD IS APPLIED AND APPARATUS THEREFOR

TECHNICAL FIELD

The present invention relates to a method for a user equipment to communicate data by modifying a connection relation between component carriers in a mobile communication system to which a carrier aggregation scheme is applied and a user equipment for the same.

BACKGROUND ART

The standard of LTE-A technology, which is a candidate IMT-Advanced technology of the International Telecommunication Union (ITU), has been designed to meet the requirements of the IMT-Advanced technology of the ITU. In the LTE-A system, Carrier Aggregation (CA) technology, which aggregates and uses a plurality of component carriers each of which may be used as a carrier in the existing LTE system, is being discussed to extend bandwidth.

If a plurality of downlink component carriers and/or a plurality of uplink component carriers are configured for one UE, there may be a problem associated with connection relations between the component carriers unlike when a downlink component carrier and an uplink component carrier are configured for one UE.

That is, if connection relations between downlink component carriers and uplink component carriers are indefinitely established, it will be difficult to determine an uplink component carrier through which feedback information for data received through a downlink component carrier is to be transmitted.

In addition, when a new component carrier different from pre-set component carriers is added, there may also be a problem associated with a connection relation established for communication of data through the added component carrier and therefore there is a need to provide a solution to such a problem.

DISCLOSURE

Technical Problem

In view of the above need, an object of the present invention is to provide a method for a user equipment to communicate data by modifying a connection relation between component carriers in a mobile communication system to which a carrier aggregation scheme is applied and a user equipment for the same.

Technical Solution

To accomplish the above object, one aspect of the present invention suggests a method for a user equipment to communicate data by modifying a connection relation between component carriers in a mobile communication system to which a carrier aggregation scheme is applied, the method including receiving a message including identifier information that modifies a connection relation between at least one downlink component carrier and at least one uplink component carrier from a base station, receiving data from the base station through one of the at least one downlink component carrier, and transmitting feedback data for the received data to the base station through an uplink component carrier modified based on the identifier information.

Here, the message may further include information for addition of a first downlink component carrier, and the identifier information may include information for configuration of a connection relation between the added first downlink component carrier and one of the at least one uplink component carrier.

In addition, the message may further include information for removal of a second downlink component carrier among the at least one downlink component carrier, and the identifier information may include information for configuration of a connection relation between one of the at least one downlink component carrier other than the second downlink component carrier to be removed and an uplink component carrier connected to the second downlink component carrier to be removed.

Further, the message may further include information for addition of a first uplink component carrier, and the identifier information may include information for configuration of a connection relation between the added first uplink component carrier and one of the at least one downlink component carrier.

Furthermore, the message may further include information for removal of a second uplink component carrier among the at least one uplink component carrier, and the identifier information may include information for configuration of a connection relation between one of the at least one uplink component carrier other than the second uplink component carrier to be removed and a downlink component carrier connected to the second uplink component carrier to be removed.

Advantageous Effects

According to the embodiments of the present invention described above, it is possible to efficiently change a connection relation between component carriers for data communication through a message in a mobile communication system that uses a carrier aggregation scheme while it is possible to easily configure a new connection relation through identifier information included in a message.

DETAILED DESCRIPTION OF EMBODIMENTS OF THE INVENTION

Reference will now be made in detail to the preferred embodiments of the present invention with reference to the accompanying drawings. The detailed description, which will be given below with reference to the accompanying drawings, is intended to explain exemplary embodiments of the present invention, rather than to show the only embodiments that can be implemented according to the invention. For example, although the present invention will be described with reference to a 3GPP LTE based system as an example of a mobile communication system, the present invention may be applicable in various ways as a method for a UE to perform power-efficient measurement in various mobile communication systems, such as an IEEE 802.16 based system, to which carrier aggregation technology is applicable.

The following detailed description includes specific details in order to provide a thorough understanding of the present invention. However, it will be apparent to those skilled in the art that the present invention may be practiced without such specific details. In some cases, known structures and devices are omitted or shown in block diagram form, focusing on important features of the structures and devices, so as not to obscure the concept of the present invention. The same reference numbers will be used throughout this specification to refer to the same or similar elements.

A method for power-efficiently performing channel quality measurement in a mobile communication system which uses a carrier aggregation scheme as described above and a UE for the same will be described below. To this end, first, a 3GPP LTE system is briefly described as an example of a mobile communication system to which the present technology may be applied.

Figure 1:
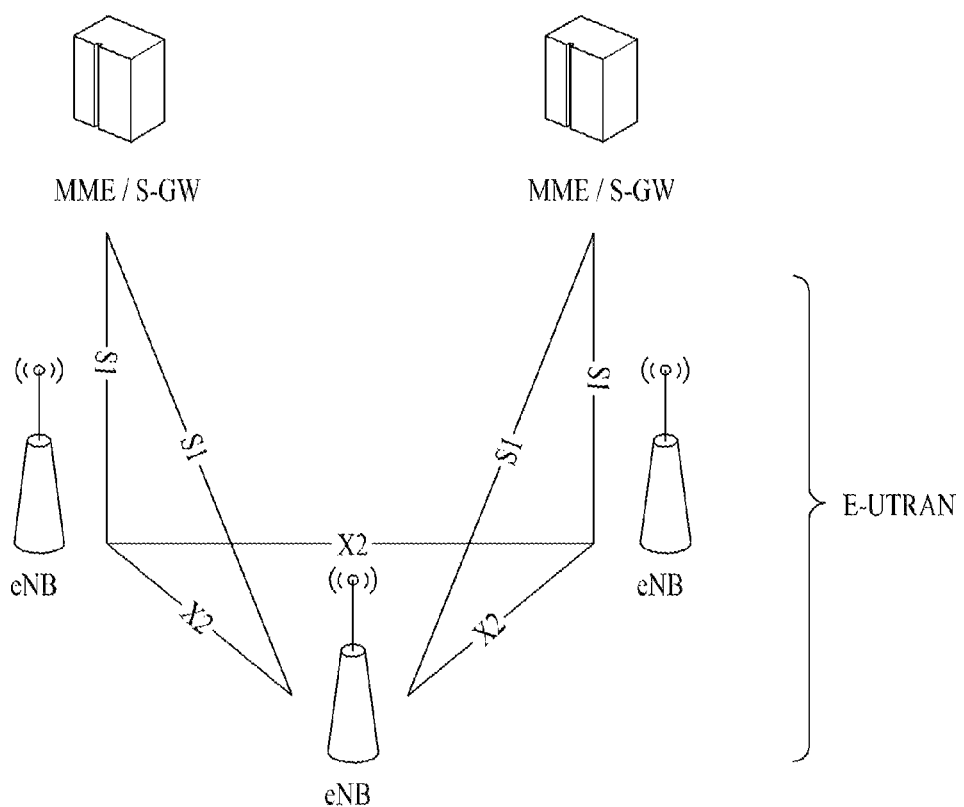
FIG. 1 illustrates a network structure of an Evolved Universal Terrestrial Radio Access Network (E-UTRAN) as an example of a mobile communication system.

FIG. 1 illustrates a network structure of an Evolved Universal Terrestrial Radio Access Network (E-UTRAN) as an example of a mobile communication system. The E-UTRAN system is an evolved version of the conventional UTRAN system and the basic standardization thereof is currently underway in the 3GPP. The E-UTRAN system is also referred to as a Long Term Evolution (LTE) system.

The E-UTRAN includes e-NodeBs (eNBs or base stations) and eNBs are connected through X2 interfaces. An eNB is connected to a User Equipment (UE) through a radio interface and is connected to an Evolved Packet Core (EPC) through an S1 interface.

The EPC includes a Mobile Management Entity (MME), a Serving-Gateway (S-GW), and a Packet Data Network-Gateway (PDN-GW). The MME contains UE access information or information associated with UE capabilities. Such information is mainly used for UE mobility management. The S-GW is a gateway whose end point is the E-UTRAN and the PDN-GW is a gateway whose end point is the PDN.

Layers of Radio Interface Protocol between a UE and a network may be classified into an L1 layer (first layer), an L2 layer (second layer), and an L3 layer (third layer) based on the lower 3 layers of the Open System Interconnection (OSI) reference model that is widely known in communication systems. A physical layer which belongs to the first layer provides an information transfer service using a physical channel and a Radio Resource Control (RRC) layer located at the third layer serves to control radio resources between the UE and the network. To accomplish this, the RRC layer exchanges RRC messages between the UE and an eNB.

Figure 2:
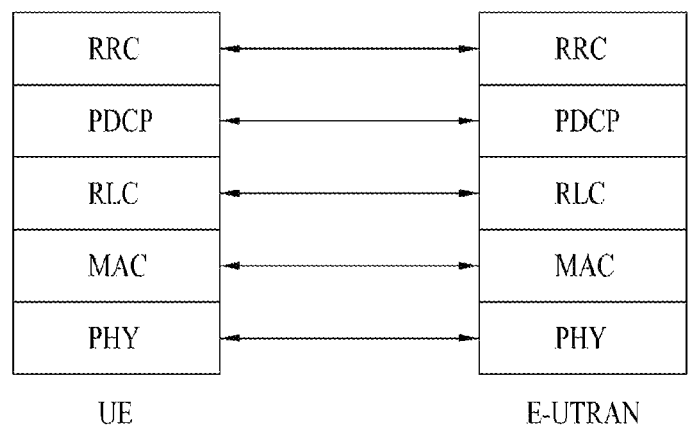
FIGS. 2 and 3 illustrate a radio interface protocol between a UE and an E-UTRAN based on the 3GPP wireless access network standard.
Figure 3:
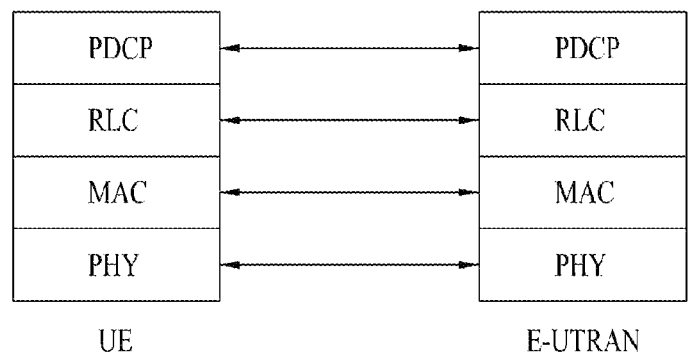

FIGS. 2 and 3 illustrate a radio interface protocol between a UE and an E-UTRAN based on the 3GPP wireless access network standard.

The radio interface protocol is horizontally divided into a physical layer, a data link layer, and a network layer and is vertically divided into a user plane (U-plane) for data/information transfer and a control plane (C-plane) for control signal (signaling information) transfer. The protocol layers of FIGS. 2 and 3 may be classified into an L1 layer (first layer), an L2 layer (second layer), and an L3 layer (third layer) based on the lower 3 layers of the Open System Interconnection (OSI) reference model that is widely known in communication systems. Such radio protocol layers are provided in pairs in the UE and the E-UTRAN and are responsible for data transmission in radio intervals.

The layers of the radio protocol control plane of FIG. 3 and the radio protocol user plane of FIG. 3 are described below.

The physical layer of the first layer provides an information transfer service to higher layers using a physical channel. The physical layer is connected to the Media Access Control (MAC) layer, which is located above the physical layer, through a transport channel. Data is delivered between the MAC layer and the physical layer through the transport channel. Data is delivered between different physical layers, i.e., between physical layers of transmitting and receiving sides, through a physical channel. The physical channel is modulated according to an Orthogonal Frequency Division Multiplexing (OFDM) scheme and utilizes time and frequency as radio resources.

A MAC layer of the second layer provides a service to a Radio Link Control (RLC) layer, which is located above the MAC layer, through a logical channel. The RLC layer of the second layer supports reliable data transmission. The functionality of the RLC layer may be implemented as a functional block within the MAC layer. In this case, the RLC layer may be absent. A PDCP layer of the second layer performs a header compression function to reduce the size of an IP packet header that contains relatively large and unnecessary control information in order to achieve efficient transmission in a small-bandwidth radio interval when transmitting an IP packet such as an IPv4 or IPv6 packet.

A Radio Resource Control (RRC) layer located at the bottom of the third layer is defined only in the control plane and is responsible for control of logical channels, transport channels, and physical channels in association with configuration, re-configuration, and release of Radio Bearers (RBs). Here, the term "RB" refers to a service that is provided by the second layer for data transfer between a UE and a UTRAN. The UE is in an RRC_CONNECTED state when there is an RRC connection between an RRC layer of the UE and an RRC layer of a wireless network and is in an RRC_IDLE state when there is no RRC connection.

Downlink transport channels which transmit data from a network to a UE include Broadcast Channel (BCH) that transmits system information and downlink Shared Channel (SCH) that transmits user traffic or control messages. Traffic or control messages of downlink multicast or broadcast service may be transmitted through downlink SCH or may be transmitted through downlink Multicast Channel (MCH). Uplink transport channels that transmit data from a UE to a network include Random Access Channel (RACH) that transmits initial control messages and uplink SCH that transmits user traffic or control messages.

Logical channels, which are located above transport channels and are mapped thereto, include Broadcast Channel (BCCH), Paging Control Channel (PCCH), Common Control Channel (CCCH), Multicast Control Channel (MCCH), and Multicast Traffic Channel (MTCH).

A physical layer includes a plurality of subframes in the time axis and a plurality of subcarriers in the frequency axis. One subframe includes a plurality of symbols in the time axis. One subframe includes a plurality of resource blocks, each of which includes a plurality of symbols and a plurality of subcarriers. Each subframe may use specific subcarriers of specific symbols (for example, the first symbol) in the subframe for a Physical Downlink Control Channel (PDCCH), i.e., an L1/L2 control channel. One subframe may include 2 slots, each having a length of 0.5 ms, and one subframe may correspond to a Transmission Time Interval (TTI) of 1 ms which is a unit time for transmitting data.

The following is a description of system information. System information includes essential information that a UE should know to access an eNB. Accordingly, the UE should receive all system information before accessing the eNB and the system information received by the UE should always be the latest system information. Since all UEs in one cell should acquire the system information, the eNB transmits the system information periodically.

The system information is divided into a Master Information Block (MIB), a Scheduling Block (SB), and a System Information Block (SIB). The MIB allows the UE to know a physical configuration (for example, bandwidth) of the corresponding cell. The SB notifies the UE of transmission information (for example, transmission period) of SIBs. The SIB is a set of related system information. For example, one SIB includes information of only adjacent cell(s) while another SIB includes information of only uplink radio channel(s) used by the UE.

Services that the network provides to the UE may be classified into 3 types. The UE identifies the type of a cell differently according to which services the UE can receive from the cell. First, the service types are described as follows and then the types of the cell are described.

1) Limited service: This service provides an emergency call and an ETWS and can be provided by an acceptable cell.

2) Normal service: This is a general service for public use and can be provided by a suitable cell.

3) Operator service: This is a service for a communication network provider and the corresponding cell can be used only by the communication network provider and cannot be used by general users.

The types of cells can be classified as follows in association with the types of services provided by the cells.

1) Acceptable cell: This is a cell in which a limited service can be provided for the UE. This cell is not barred for the UE and satisfies cell selection criteria for the UE.

2) Suitable cell: This is a cell in which a normal service can be provided for the UE. This cell satisfies acceptable cell conditions while satisfying additional conditions. The additional conditions include a condition that the cell belongs to a PLMN that can be accessed by the UE and a condition that, in the cell, the UE is not prohibited from performing a tracking area update procedure. If the cell is a CSG cell, it is required that the UE be able to access the cell as a CSG member.

3) Barred cell: This is a cell that broadcasts information indicating that it is a barred cell through system information.

4) Reserved cell: This is a cell that broadcasts information indicating that it is a reserved cell through system information.

An RRC state and RRC connection method of a UE are described below. The RRC state indicates whether or not an RRC layer of the UE is logically connected to an RRC layer of the E-UTRAN. It is stated that the UE is in an RRC_CONNECTED state when there is a logical connection between the RRC layer of the UE and the RRC layer of the E-UTRAN and it is stated that the UE is in an RRC_IDLE state when there is no logical connection therebetween. When the UE is in an RRC_CONNECTED state, the E-UTRAN can determine presence or absence of the UE on a cell basis since there is an RRC connection between the UE and the E-UTRAN and therefore can easily control the UE. On the other hand, the UE is in an RRC_IDLE state cannot be identified by the E-UTRAN, and can be managed by a core network on the basis of a tracking area which is an area unit greater than the cell. That is, when the UE is in an RRC_IDLE state, only the presence or absence of the UE is identified on a large area basis and the UE needs to shift to an RRC_CONNECTED state in order to receive a normal mobile communication service such as a voice or data service.

When the user initially powers the UE on, first, the UE searches for an appropriate cell and then remains in an RRC_IDLE state in the cell. When the UE needs to establish an RRC connection while the UE remains in an RRC_IDLE state, the UE shifts to an RRC_CONNECTED state by establishing an RRC connection with the E-UTRAN through an RRC connection procedure. In various cases, there may be a need to establish an RRC connection while the UE is in an idle state. For example, the UE may need to establish an RRC connection when there is a need to transmit uplink data because of the user's attempt to call or when there is a need to transmit a response message in response to a paging message received from the E-UTRAN.

A Non-Access Stratum (NAS) layer which is located above the RRC layer performs functions such as session management and mobility management.

In the NAS layer, two states, an EPS Mobility Management-registered (EMM-REGISTERED) state and an EMM-DEREGISTERED state, are defined in order to manage mobility of the UE. These two states are applied to the UE and the MME. Initially, the UE is in an EMM-DEREGISTERED state. Here, the UE performs a procedure for registering the UE in a network through an initial attach procedure in order to access the network. When the attach procedure has been successfully performed, the UE and the MME enter an EMM-REGISTERED state.

Two states, an EPS Connection Management (ECM)-IDLE state and an ECM-CONNECTED state, are defined in order to manage signaling connection between the UE and the EPC. These two states are applied to the UE and the MME. If the UE establishes an RRC connection with the E-UTRAN when the UE is in an ECM-IDLE state, the UE enters an ECM-CONNECTED state. If the MME establishes an S1 connection with the E-UTRAN when the MME is in an ECM-IDLE state, the MME enters an ECM-CONNECTED state. When the UE is in an ECM-IDLE state, the E-UTRAN does not have context information of the UE. Therefore, the UE performs a UE-based mobility related procedure such as cell selection or reselection without the need to receive a command from the network. On the other hand, when the UE is in an ECM-CONNECTED state, mobility of the UE is managed by a command from the network. When the position of the UE has changed from that known by the network while the UE is in an ECM-IDLE state, the UE notifies the network of the changed position of the UE through a tracking area update procedure.

The following is a description of a radio link failure procedure in a 3GPP LTE system.

Figure 4:
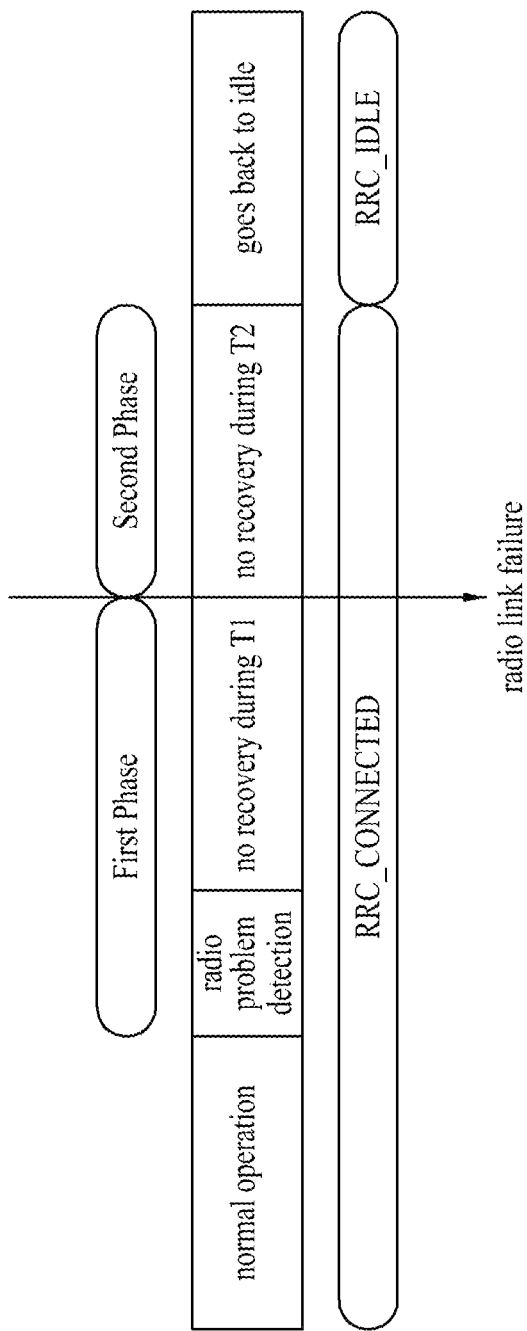
FIG. 4 illustrates operations associated with radio link failure.

A UE constantly performs measurement in order to maintain the quality of a communication link with a cell which currently provides a service to the UE. Specifically, the UE determines whether or not the quality of the communication link with the cell that currently provides a service to the UE is bad to the extent that communication is impossible. Upon determining that the quality of the communication link is bad to the extent that communication is impossible, the UE declares radio link failure. If the UE declares radio link failure, the UE gives up keeping the communication with the cell and then attempts RRC connection re-establishment after selecting a cell through a cell selection procedure. Operations associated with such radio link failure may be performed in two steps as shown in FIG. 4.

In the first step, the UE checks if there is a problem in the current communication link. If there is a problem, the UE declares a radio link problem and awaits recovery of the communication link for a predetermined time of T1. If the link is recovered within the time T1, the UE continues normal operation. If the radio link problem is not solved within the time T1, the UE declares radio link failure and enters the second step. In the second step, the UE performs an RRC connection re-establishment procedure for recovery from the radio link failure.

The RRC connection re-establishment procedure is a procedure for re-establishing an RRC connection in an RRC_CONNECTED state. The UE does not initialize all radio configuration (for example, radio bearer configuration) of the UE since the UE remains in an RRC_CONNECTED state, i.e., since the UE does not enter an RRC_IDLE state. Instead, the UE suspends use of all radio bearers excluding SRB0 when starting the RRC connection re-establishment procedure. If RRC connection re-establishment is successful, the UE resumes using the radio bearers, the use of which has been suspended.

Figure 5:
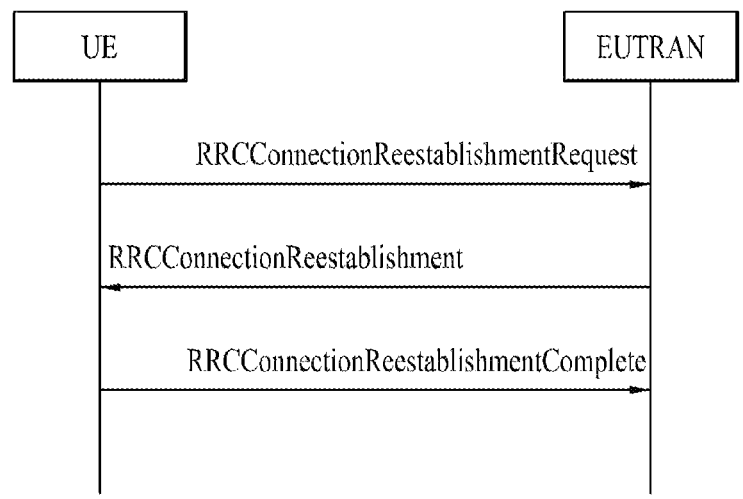
FIGS. 5 and 6 illustrate the case in which an RRC connection re-establishment procedure is successful and the case in which an RRC connection re-establishment procedure has failed.
Figure 6:
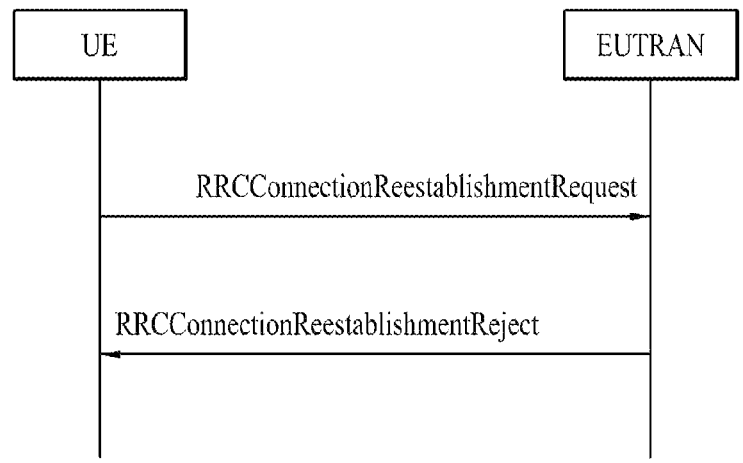

FIGS. 5 and 6 illustrate the case in which an RRC connection re-establishment procedure is successful and the case in which an RRC connection re-establishment procedure has failed.

How a UE operates in the RRC connection re-establishment procedure is described below with reference to FIGS. 5 and 6. First, the UE performs a cell selection procedure to select one cell. The UE receives system information in order to receive basic parameters for cell access from the selected cell. Then, the UE attempts RRC connection re-establishment through a random access procedure. When the cell that the UE has selected through cell selection is a cell (i.e., a prepared cell) which has context of the UE, the cell can accept the RRC connection re-establishment request of the UE, resulting in that the RRC connection re-establishment procedure is successful. However, when the cell selected by the UE is not a prepared cell, the cell cannot accept the RRC connection re-establishment request of the UE since the cell has no context of the UE, resulting in failure of the RRC connection re-establishment procedure.

Figure 7:
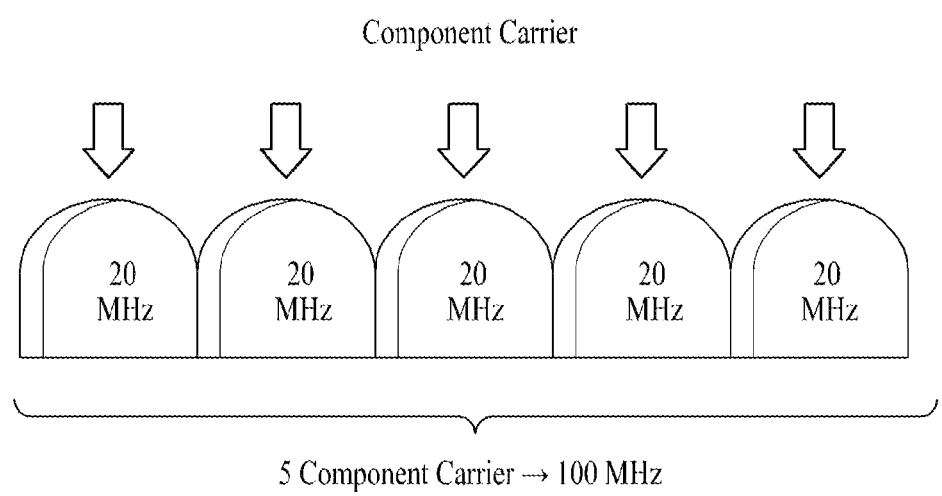
FIG. 7 illustrates carrier aggregation technology that is applied to a 3GPP LTE-A system.

FIG. 7 illustrates carrier aggregation technology that is applicable to a 3GPP LTE-A system.

The standard of LTE-A technology, which is a candidate IMT-Advanced technology of the International Telecommunication Union (ITU), has been designed to meet the requirements of the IMT-Advanced technology of the ITU. Accordingly, it is being discussed that LTE-A system bandwidth is extended compared to the existing LTE system bandwidth in order to satisfy the requirements of the ITU. To extend the bandwidth in the LTE-A system, it is being discussed that carriers that may be used in the existing LTE system are defined as component carriers (CCs) and the defined CCs are used in groups, each including up to 5 CCs. Since each CC may have a bandwidth of up to 20 MHz as in the LTE system, the bandwidth can be extended up to 100 MHz. Such technology for using CCs in groups, each including a plurality of CCs, is referred to as Carrier Aggregation (CA).

To use CCs, the UE needs to receive configuration information of CCs from an eNB. The CC configuration information may include at least part of CC system information and/or parameter values associated with respective operations of CCs. Upon receiving the CC configuration information from the eNB, the UE can transmit and receive data through each CC.

As described above, in the LTE-A system, a plurality of CCs can be configured and the configuration of the plurality of CCs may be modified or the configuration may be changed such that a new CC is added to the plurality of CCs or a CC is removed from the plurality of CCs.

Such a change can be made through an RRC connection re-establishment procedure. For example, to add a new CC to a plurality of CCs configured for a UE, the network may transmit, to the UE, an RRC connection re-establishment message including configuration information of the plurality of CCs required to run a new CC that is to be added to the plurality of CCs for the UE and the UE may configure a plurality of CCs by adding the new CC using the received CC configuration information.

For example, the eNB may modify CCs through a message structure as shown in the following table.

TABLE 1

| Level-n IE | Level n + k IE | Level n + k + 1 IE | Level n + k + 2 IE |
|---|---|---|---|
| Add CC, Modify CC, | CC Identification Information, CC configuration | DL CC configuration | DL CC specific configuration IE . . . . . . UL Feedback CC identifier |
| | | UL CC configuration (OPTIONAL) | UL CC specific configuration IE . . . . . . DL Feedback CC identifier |
| Release CC | CC identifier, Release Indicator {UL CC only release, DL CC only release, UL and DL CC release} | | |

Table 1 is merely exemplary and it is possible to change, add, and remove CCs using various other methods without being limited to the method of Table 1.

Here, when a plurality of downlink CCs and/or a plurality of uplink CCs are configured for a UE and configuration information is changed, a CC is removed from the plurality of CCs, or a new CC is added to the plurality of CCs, there may be a problem associated with a connection relation between each CC unlike when one downlink CC and one uplink CC are configured for a UE.

This is described below with reference to FIG. 8.

FIG. 8 illustrates an exemplary connection relation between a single CC and a single CC in a carrier aggregation scheme and an exemplary addition of a downlink CC.

Figure 8A:
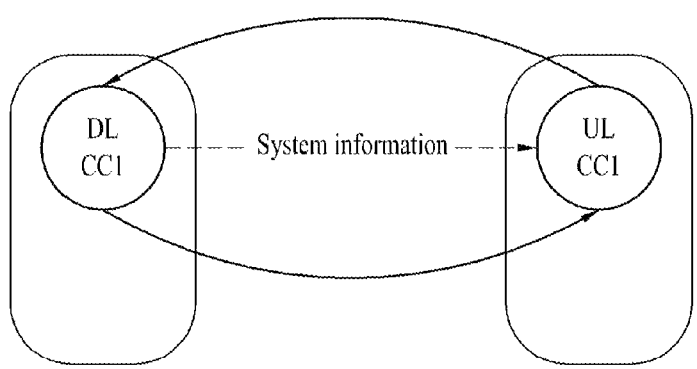
FIGS. 8A-8B illustrate an exemplary connection relation between a single CC and a single CC according to system information in a carrier aggregation scheme and exemplary addition of a downlink CC.

In the case of FIG. 8A, there is only one connection relation between uplink and downlink CCs since a single downlink CC and a single uplink CC are configured for a UE. Generally, when a UE receives downlink system information of a CC, the UE can identify uplink information (for example, uplink frequency information) of an uplink connected to the downlink.

The connection relation of FIG. 8A can be considered as the connection relation by means of system information. Hereinafter, for ease of explanation, in drawings associated with embodiments of the present invention, a connection relation between an uplink and a downlink is shown by a dotted line when it is a connection relation by means of system information.

Figure 8B:
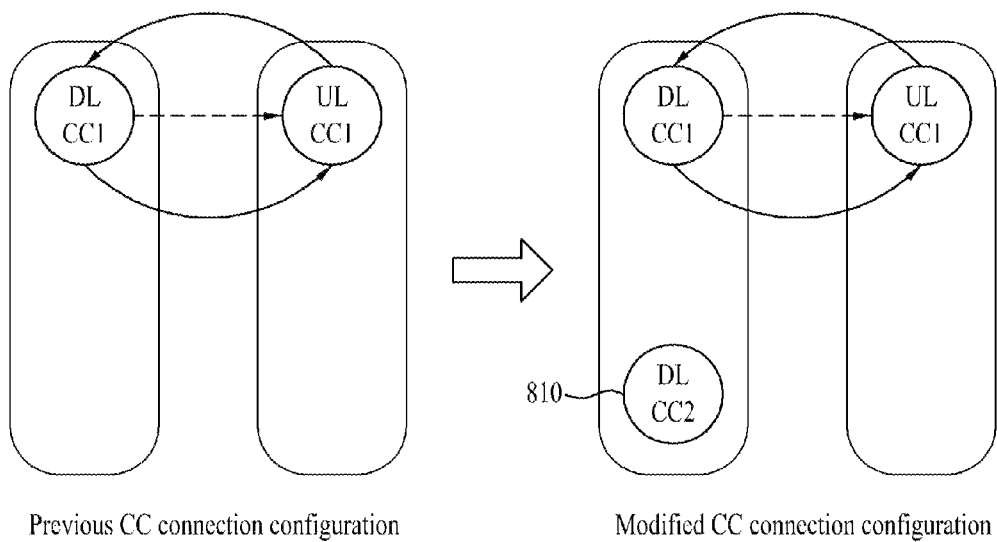

Unlike the example of FIG. 8A, one downlink CC 810 is added in the example of FIG. 8B. When a plurality of uplink CCs or a plurality of downlink CCs is configured for a UE, connection relations between the uplink and downlink CCs may be indefinite. For example, when a connection relation between the added downlink CC 810 and the uplink CC is not clearly determined, there may be a problem in that it is difficult to determine an uplink CC through which feedback information for data received through the added downlink CC 810 is to be transmitted to the eNB.

In addition, when a pre-set downlink CC is removed, there may also be a problem in a method of communicating data through an uplink CC that has been configured to be in a connection relation with the removed downlink CC.

Accordingly, the present invention provides a method in which a downlink CC and/or an uplink CC are changed, added, or deleted, a message including identifier information specifying new connection relations is received, and data is communicated according to the identifier information included in the received message in a mobile communication system that employs carrier aggregation.

Various embodiments of the present invention are described below in detail.

First, a method for modifying configuration of a plurality of CCs that have been pre-set is described below with reference to FIG. 9.

Figure 9:
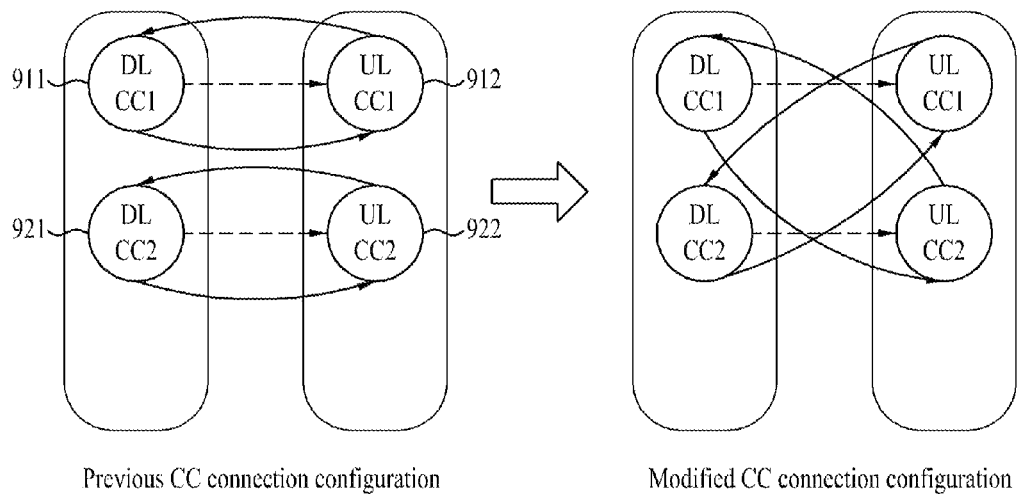
FIG. 9 illustrates an example in which connection relations between CCs are changed through identifier information.

FIG. 9 illustrates an example in which connection relations between CCs are changed through identifier information.

Before the configuration is changed, downlink CC 1 (911) is connected to uplink CC 1 (912) and downlink CC 2 (921) is connected to uplink CC 2 (922) to enable data communication.

At this time, a UE can receive a message including identifier information for modifying a connection relation between at least one downlink CC and at least one CC from an eNB.

The message of FIG. 9 does not include CC addition or removal information and includes identifier information for modifying connection relations between existing CCs.

Upon receiving the message, the UE may configure a new connection relation based on the identifier information included in the received message, connect the downlink CC 1 (911) to the uplink CC 2 (922) and connect the downlink CC 2 (921) to the uplink CC 1 (912) to enable data communication.

Namely, before the connection relations are changed through the message, the UE transmits corresponding feedback information to the eNB through the uplink CC 1 (912) upon receiving data through the downlink CC 1 (911). However, after the connection relations are changed through the message, the UE transmits the corresponding feedback information to the eNB through the uplink CC 2 (922).

The feedback information may be response data of the UE to data received from the eNB and may include feedback (HARQ ACK/NACK) of MAC layer.

Although the above description has been given with reference to the case in which feedback data for the received data is transmitted, the present invention is not limited thereto.

That is, not only when the UE transmits feedback data after receiving data but also when the UE transmits preliminary information (for example, channel status information, a precoding matrix index, a rank indicator, a scheduling request, or a reference signal) to the eNB before receiving data, modified connection relations between CCs indicated by identifier information included in a message may be applied to perform communication.

It is also possible to add a new downlink CC through a message that further includes information for adding a new downlink CC according to an embodiment of the present invention. In this case, identifier information included in the message includes information for configuration of a connection relation between an uplink CC and the added downlink CC to enable data communication.

Figure 10:
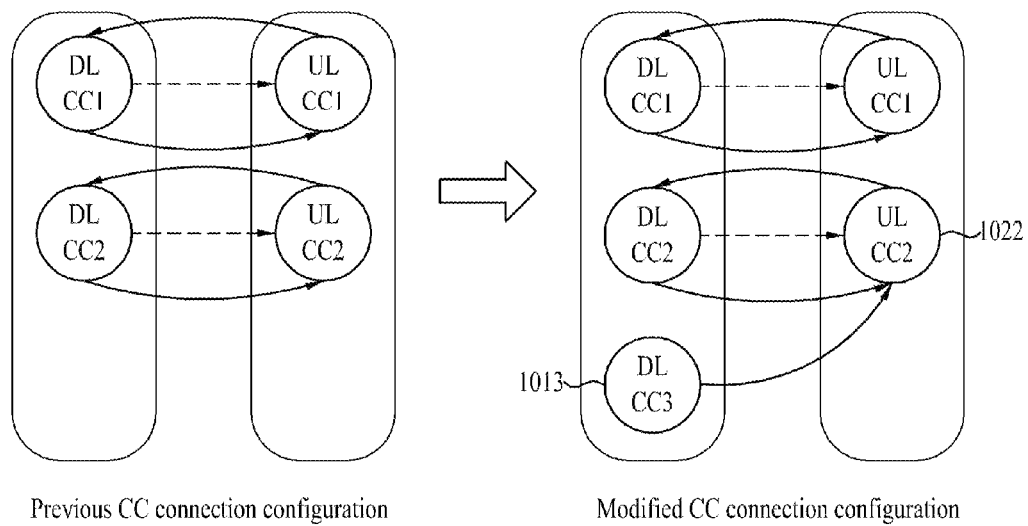
FIG. 10 illustrates an example in which a downlink CC is added and a new connection relation is configured.

FIG. 10 illustrates an example in which a downlink CC is added and a new connection relation is configured.

In the example of FIG. 10, a downlink CC may be added and a new connection relation may be configured through a message and identifier information included in the message as shown in the following table.

```
CC configuration message
  + Add CC3
    – CC configuration
      * DL CC configuration
        >> DL CC specific configurations
        >> UL Feedback CC identifier = CC2
```

Feedback information for data received through downlink CC 3 (1013) that is newly added as shown in Table 2 is transmitted to an eNB through uplink CC 2 (1022).

However, Table 2 is merely exemplary and it is possible to add a CC and to configure a new connection relation using various other methods without being limited to the method of Table 2.

Meanwhile, an embodiment of the present invention provides a function to remove an existing downlink CC through a message that further includes downlink CC removal information. Here, although an uplink CC that has been connected to a downlink CC to be removed may cause a problem, this problem can be solved since identifier information included in the message includes configuration information for a new connection relation of the uplink CC that has been connected to the downlink CC to be removed.

Figure 11:
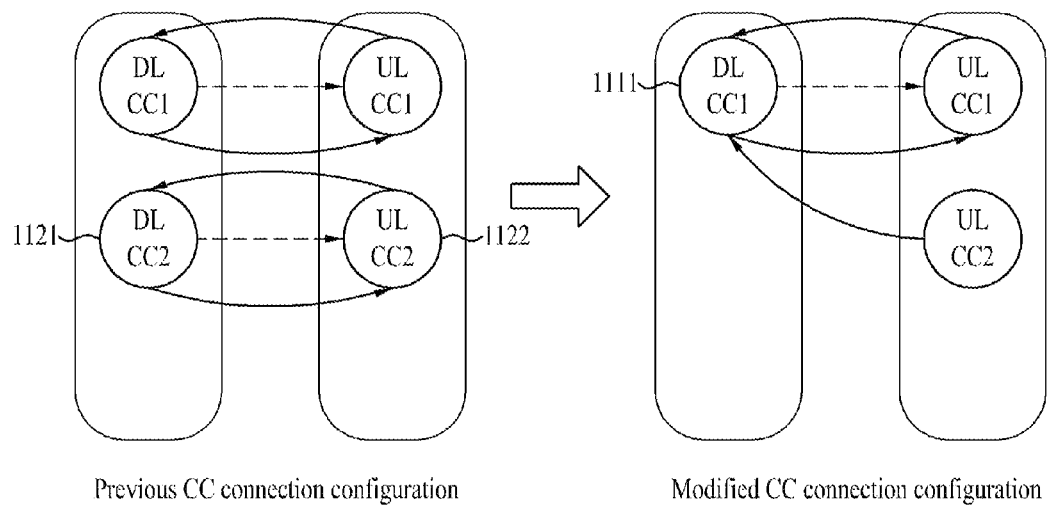
FIG. 11 illustrates an example in which an existing downlink CC is removed and a new connection relation is configured.

FIG. 11 illustrates an example in which an existing downlink CC is removed and a new connection relation is configured.

In the example of FIG. 11, a downlink CC may be removed and a new connection relation may be configured through a message and identifier information included in the message as shown in the following table.

```
CC configuration message
  + Release CC2
    – CC identifier = CC2
    – DL CC only release indication
  + Modify CC2
    – CC configuration
      * UL CC configuration
        >> DL Feedback CC identifier = CC1
```

As shown in Table 3, downlink CC 2 (1121) is removed and uplink CC 2 (1122) that has been connected to the downlink CC 2 (1121) is connected to downlink CC 1 (1111) to enable data communication.

However, Table 3 is merely exemplary and it is possible to remove a CC and to configure a new connection relation using various other methods without being limited to the method of Table 3.

In addition, according to an embodiment of the present invention, it is possible to add a new uplink CC through a message that further includes uplink CC addition information. In this case, identifier information included in the message includes configuration information for a connection relation between the added uplink CC and a downlink CC, thereby allowing data communication.

Figure 12:
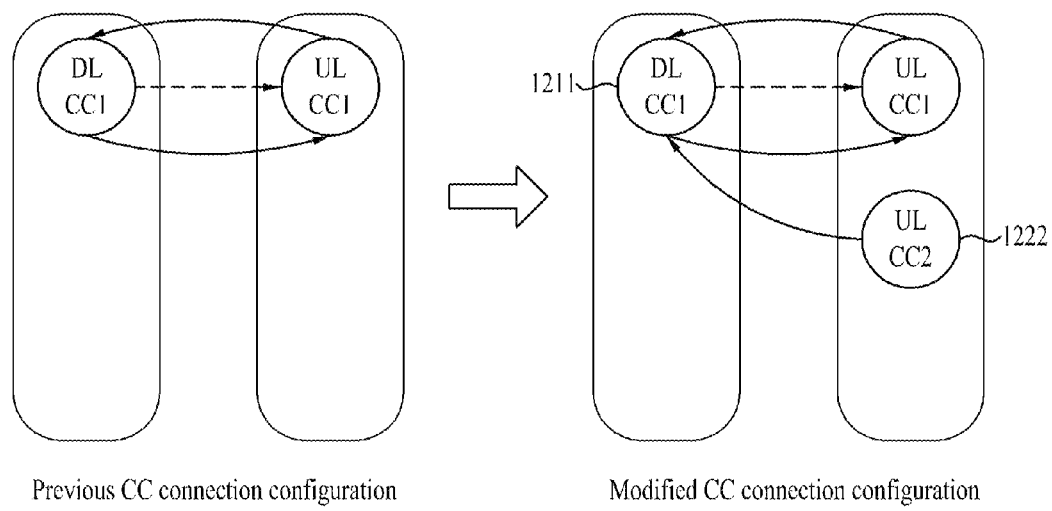
FIG. 12 illustrates an example in which an uplink CC is added and a new connection relation is configured.

FIG. 12 illustrates an example in which an uplink CC is added and a new connection relation is configured.

In the example of FIG. 12, an uplink CC may be added and a new connection relation may be configured through a message and identifier information included in the message as shown in the following table.

```
CC configuration message
  + Add CC2
    – CC configuration
```

-continued

```
      * UL CC configuration
        >> UL CC specific configurations
        >> DL Feedback CC identifier = CC2
```

As shown in Table 4, feedback information for data transmitted through uplink CC 2 (1222) that is newly added is received by a UE through downlink CC 1 (1211).

However, Table 4 is merely exemplary and it is possible to add a CC and to configure a new connection relation using various other methods without being limited to the method of Table 4.

In addition, according to an embodiment of the present invention, it is possible to provide a function to change an existing connection relation through identifier information included in a message while adding an uplink CC.

Figure 13:
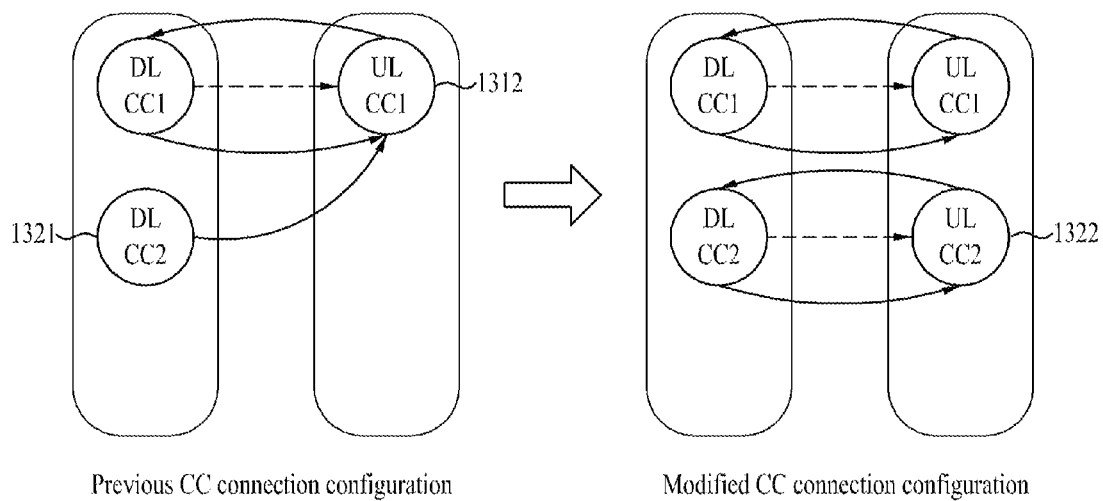
FIG. 13 illustrates an example in which an uplink CC is added and a connection relation between the added uplink CC and an existing downlink CC is configured.

FIG. 13 illustrates an example in which an uplink CC is added and a connection relation between the added uplink CC and an existing downlink CC is configured.

In the example of FIG. 13, an uplink CC may be added, a new connection relation may be configured, and an existing connection relation may be modified through a message and identifier information included in the message as shown in the following table.

```
CC configuration message
  + Modify CC2
    – CC configuration
      * UL CC configuration
        >> UL CC specific configurations
        >> DL Feedback CC identifier = CC2
      * DL CC configuration
        >> UL Feedback CC identifier = CC2
```

As shown in Table 5, an existing connection relation configured between downlink CC 2 (1312) and an uplink CC 1 (1321) is changed and a new connection relation is configured between newly added uplink CC 2 (1322) and downlink CC 2 (1321), thereby enabling data communication through the new connection relation.

However, Table 5 is merely exemplary and it is possible to add a CC and to configure a changed connection relation using various other methods without being limited to the method of Table 5.

Meanwhile, an embodiment of the present invention provides a function to remove an existing uplink CC through a message that further includes uplink CC removal information. Here, although a downlink CC that has been connected to an uplink CC to be removed may cause a problem, this problem can be solved since identifier information included in the message includes configuration information for a new connection relation of the downlink CC that has been connected to the uplink CC to be removed.

Figure 14:
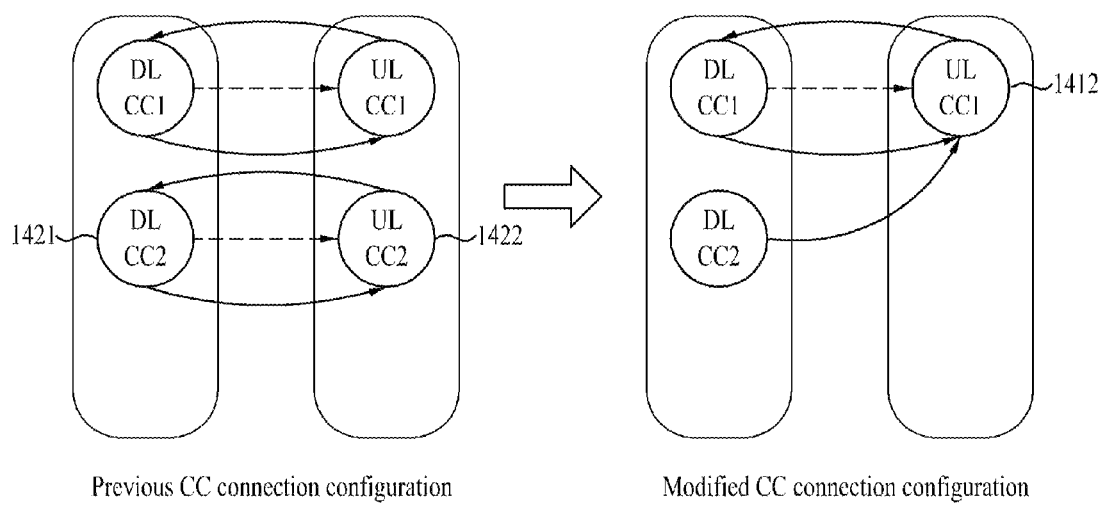
FIG. 14 illustrates an example in which an existing uplink CC is removed and a new connection relation is configured.

FIG. 14 illustrates an example in which an existing uplink CC is removed and a new connection relation is configured.

In the example of FIG. 14, an uplink CC may be removed and a new connection relation may be configured through a message and identifier information included in the message as shown in the following table.

```
CC configuration message
  + Release CC2
    – CC identifier = CC2
    – UL CC only release indication
```

-continued

```
+ Modify CC2
  - CC configuration
    * DL CC configuration
      >> UL Feedback CC identifier = CC1
```

As shown in Table 6, uplink CC 2 (1422) is removed and downlink CC 2 (1421) that has been connected to the uplink CC 2 (1422) is connected to uplink CC 1 (1412), thereby enabling data communication.

However, Table 6 is merely exemplary and it is possible to remove a CC and to configure a new connection relation using various other methods without being limited to the method of Table 6.

In addition, according to an embodiment of the present invention, it is possible to add a new downlink CC and a new uplink CC through a message that further includes uplink CC and downlink CC addition information.

Here, identifier information included in the message may include information indicating configuration of new connection relations between CCs including added downlink and uplink CCs, thereby enabling data communication.

Figure 15:
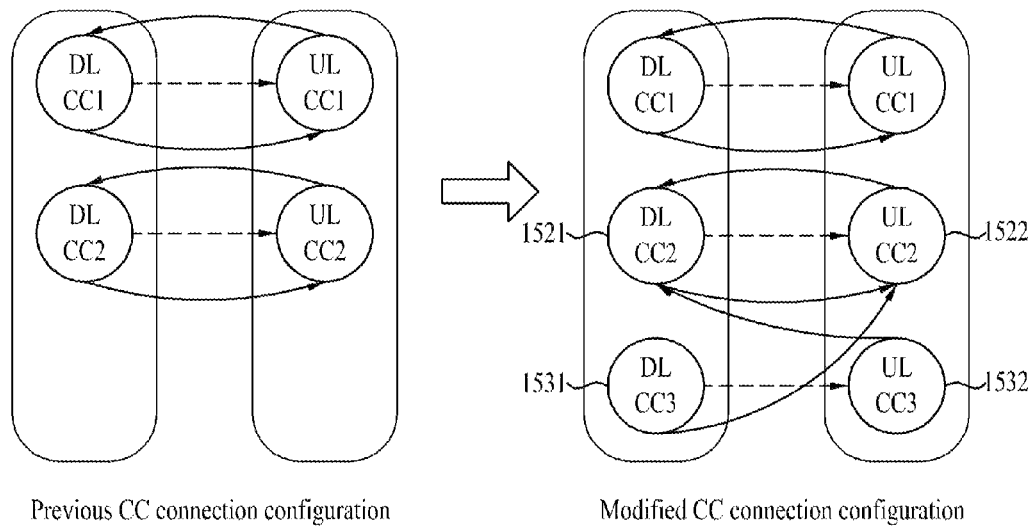
FIG. 15 illustrates an example in which a downlink CC and an uplink CC are added and a new connection relation is configured.

FIG. 15 illustrates an example in which a downlink CC and an uplink CC are added and a new connection relation is configured.

As shown in FIG. 15, downlink CC 3 (1531) and uplink CC 3 (1532) may be simultaneously added through a message and a connection relation between the added CCs may be configured.

Exemplary messages that may be applied in this case may include a combination of the messages of Table 2 and Table 5.

Accordingly, when a UE has received data through downlink CC 3 (1531), feedback information for the received data may be transmitted to an eNB through uplink CC 2 (1522).

Then, information regarding data that has been transmitted through the uplink CC 3 (1532) will be transmitted from the eNB through the downlink CC 2 (1521).

Meanwhile, according to an embodiment of the present invention, it is possible to remove an existing uplink CC while adding a new downlink CC through a message that further includes downlink CC addition information and uplink CC removal information.

Here, identifier information included in the message may include information indicating configuration of new connection relations of a downlink CC, which has been connected to an uplink CC that is to be removed, and an added downlink CC.

Figure 16:
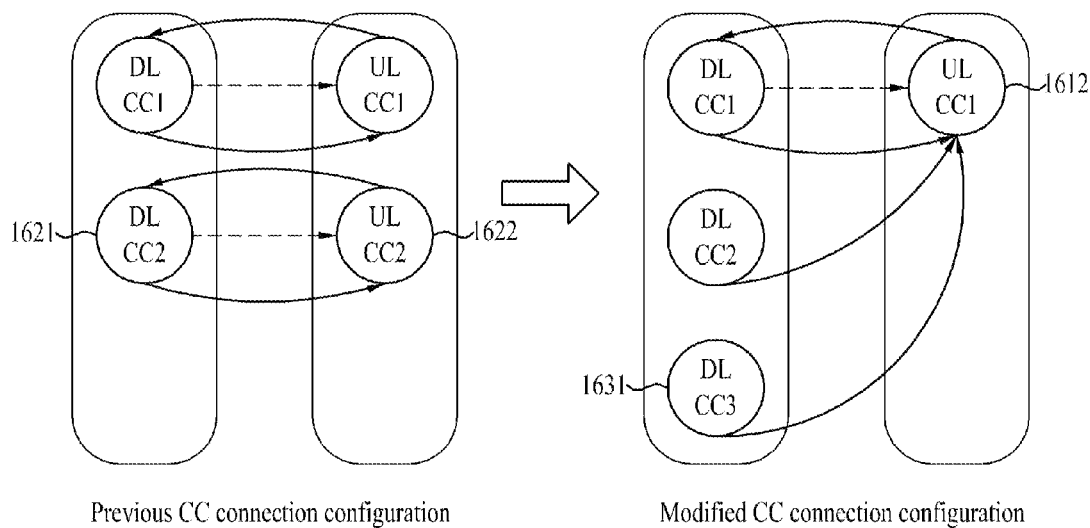
FIG. 16 illustrates an example in which a downlink CC is added, an existing uplink CC is removed, and a new connection relation is configured.

FIG. 16 illustrates an example in which a downlink CC is added, an existing uplink CC is removed, and a new connection relation is configured.

As shown in FIG. 16, new downlink CC 3 (1631) is added, uplink CC 2 (1622) is removed, a connection relation between the added downlink CC 3 (1631) and uplink CC 1 (1612) is configured through identifier information, and a new connection relation is configured between the uplink CC 1 (1612) and downlink CC 2 (1621) that has been in a connection relation with the removed uplink CC 2 (1622).

Accordingly, feedback information for data received through the downlink CC 2 (1621) or the downlink CC 3 (1631) may be transmitted to the eNB through the uplink CC 1 (1612) to perform communication.

In addition, it is possible to remove an existing downlink CC while adding a new uplink CC through a message that further includes uplink CC addition information and downlink CC removal information.

Here, identifier information included in the message may include information indicating configuration of new connection relations of an uplink CC, which has been connected to a downlink CC that is to be removed, and an added uplink CC.

Figure 17:
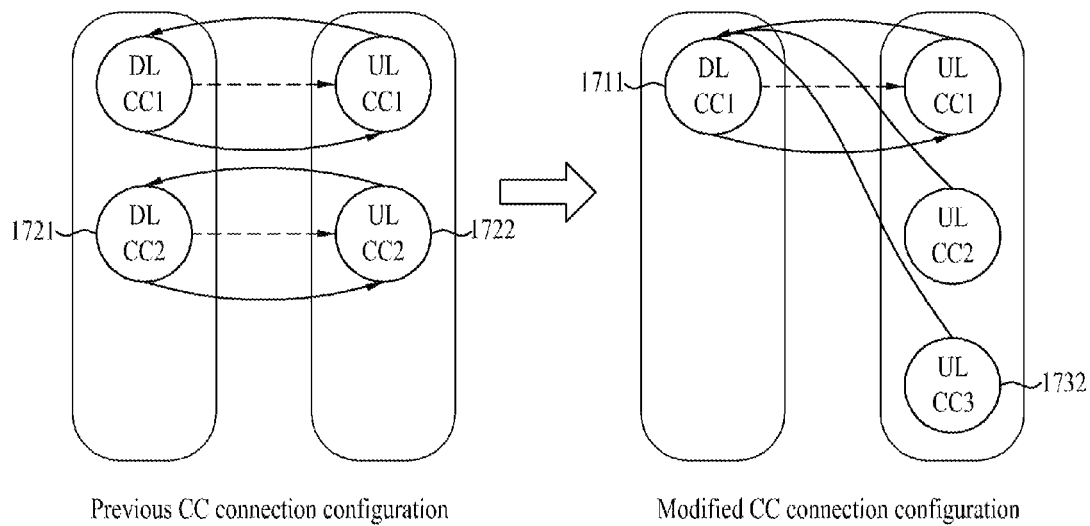
FIG. 17 illustrates an example in which a downlink CC is removed, an existing uplink CC is added, and a new connection relation is configured.

FIG. 17 illustrates an example in which a downlink CC is removed, an existing uplink CC is added, and a new connection relation is configured.

As shown in FIG. 17, new uplink CC 3 (1732) is added, downlink CC 2 (1721) is removed, a connection relation between the added uplink CC 3 (1732) and downlink CC 1 (1711) is configured through identifier information, and a new connection relation is configured between the downlink CC 1 (1711) and uplink CC 2 (1722) that has been in a connection relation with the removed downlink CC 2 (1721).

Accordingly, feedback information for data received through the uplink CC 2 (1722) or the uplink CC 3 (1732) may be received by the UE through the downlink CC 1 (1711).

Meanwhile, according to an embodiment of the present invention, it is possible to remove existing downlink and uplink CCs through a message that further includes downlink and uplink CC removal information.

Here, identifier information included in the message may include information indicating configuration of new connection relations of an uplink CC and a downlink CC that have been connected to a downlink CC and an uplink CC that are to be removed, thereby enabling data communication.

For example, messages that are used to remove a downlink CC and an uplink CC may include a combination of the messages of Table 3 and Table 5.

Figure 18:
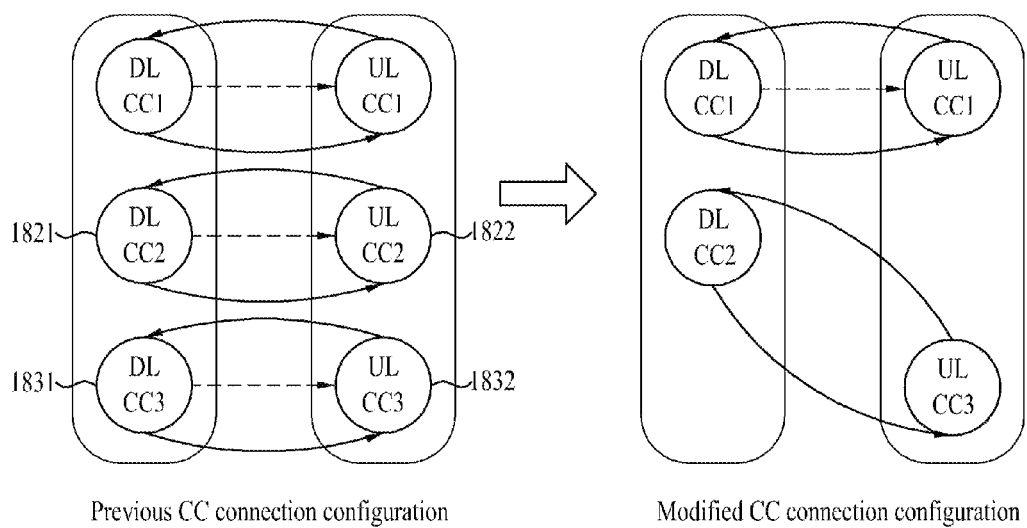
FIG. 18 illustrates an example in which an existing downlink CC and an existing uplink CC are removed and a new connection relation is configured.

FIG. 18 illustrates an example in which an existing downlink CC and an existing uplink CC are removed and a new connection relation is configured.

As shown in FIG. 18, downlink CC 3 (1831) and uplink CC 2 (1822) may be removed through information included in a message and a new connection relation may be configured between uplink CC 3 (1832) that has been connected to the removed downlink CC 3 (1831) and downlink CC 2 (1822) that has been connected to the removed uplink CC 2 (1822), thereby performing data communication.

Although a new connection relation is configured between CCs that have been in connection relations with removed CCs in the example of FIG. 18, this is merely exemplary and it is possible to configure a new connection relation between other CCs without being limited to such CCs that have been in connection relations with removed CCs.

In addition, although the above description has been given focusing on a function to transmit feedback data in response to reception of data, the present invention is not limited to such a function.

That is, a modified connection relation between CCs indicated by identifier information included in a message may be applied to performing communication not only when feedback data is received after data is transmitted but also when a UE transmits preliminary information (for example, a power headroom report) for transmitting data to an eNB.

An example in which the present invention is applied to communication of a power headroom report is described below.

First, the power headroom report generally indicates a difference between the amount of power that a UE can use for transmission on a specific CC and the amount of power that a UE has already used for transmission on the CC.

An eNB receives a power headroom report of a CC that is being used by a UE from the UE and calculates the amount of power that the UE is to use when performing transmission through the CC.

Here, to calculate power headroom for a specific CC, the UE measures path loss of the CC and reflects the measured path loss in calculation of the power headroom.

Generally, the path loss of the CC is calculated by measuring a downlink of a CC connected to an uplink of the CC through system information.

Accordingly, when the UE desires to calculate power headroom of an uplink of a specific CC for transmitting the CC through the uplink, the UE may specify a downlink CC whose path loss is to be measured and perform communication using the specified downlink CC, thereby applying the methods of the present invention.

Configuration of an association (or connection relation) suggested by the present invention may not only be applied to clarifying a feedback relationship associated with data transmission and reception as described above but may also be used for purposes described below.

First, the methods of the present invention may be applied to configuration of an association for transmitting/receiving a random access message of a UE. Before this is described in detail, a random access procedure that is provided by an LTE system is described below with reference to FIG. 19.

FIG. 19 illustrates a random access procedure to which the present invention may be applied.

Figure 19A:
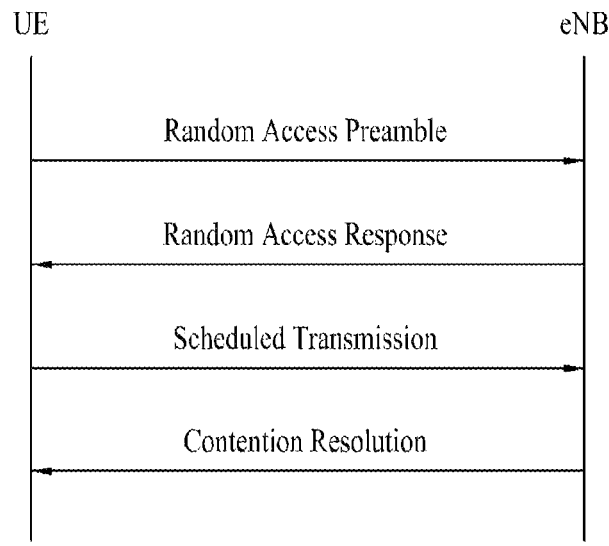
FIG. 19A illustrates a contention-based random access procedure to which the present invention may be applied.

First, FIG. 19A illustrates a contention-based random access procedure.

In the contention-based random access procedure, a UE randomly selects one random access preamble from a random access preamble set indicated through a handover command or system information, selects PRACH resources for transmitting the random access preamble, and transmits the random access preamble through the selected PRACH resources.

After the UE transmits the random access preamble, the UE attempts to receive a random access response destined for the UE within a random access response reception window through a handover command or system information transmitted by an eNB.

More specifically, the random access response information is transmitted in the form of a MAC PDU and the MAC PDU is transmitted through a PDSCH. In addition, a PDCCH is also transmitted to allow the UE to properly receive information transmitted through the PDSCH. That is, the PDCCH includes information regarding the UE which is to receive the PDSCH, frequency and time information for radio resources of the PDSCH, a transmission format of the PDSCH, and the like.

Once the UE succeeds in receiving the PDCCH designated to the UE, the UE properly receives a random access response through the PDSCH based on information of the PDCCH.

The random access response includes a random access preamble identification (ID), a UL grant (associated with uplink radio resources), a temporary C-RNTI (temporary cell identifier), and a Time Alignment Command (TAC) (including a time synchronization correction value).

Since one random access response may include random access response information for one or more UEs, the random access preamble ID needs to be included in the random access response in order to indicate a UE for which the UL grant, the temporary C-RNTI, and the TAC are valid.

In the case that the UE has received a random access response which is valid for the UE, the UE processes information items included in the random access response.

That is, the UE applies the TAC and stores the temporary C-RNTI. In addition, the UE transmits data stored in a buffer or newly generated data to the eNB.

Here, an identifier of the UE needs to be included in data of the UL grant since, in the contention-based random access procedure, the eNB cannot determine which UEs perform the random access procedure and thus needs to identify the UE in order to resolve contention at a later time.

In addition, the identifier of the UE may be included in the UL grant using two methods. In the first method, when the UE has a valid cell identifier which a corresponding cell has allocated to the UE before the random access procedure, the UE transmits the cell identifier of the UE through the UL grant.

On the other hand, when no valid cell identifier has been allocated to the UE before the random access procedure, the UE transmits data including a unique identifier of the UE (for example, an S-TMSI or a random Id). Generally, the unique identifier of the UE is longer than the cell identifier. When the UE has transmitted data through the UL grant, the UE starts a contention resolution timer.

Here, the UE awaits an instruction from the eNB for contention resolution after transmitting data including the identifier of the UE through the UL grant included in the random access response. That is, the UE attempts to receive a PDCCH for receiving a specific message.

The PDCCH may also be received using two methods. When the identifier of the UE transmitted through the UL grant is a cell identifier, the UE attempts to receive the PDCCH using the cell identifier of the UE. On the other hand, when the identifier is a unique identifier of the UE, the UE attempts to receive the PDCCH using a temporary C-RNTI included in the random access response. Thereafter, in the former case, when the UE has received the PDCCH through the cell identifier of the UE before the contention resolution timer expires, the UE determines that the random access procedure has been normally performed and terminates the random access procedure.

In the latter case, when the UE has received the PDCCH through the temporary cell identifier before the contention resolution timer expires, the UE checks data carried in a PDSCH indicated by the PDCCH. If a unique identifier of the UE is included in the data carried in the PDSCH, the UE determines that the random access procedure has been normally performed and terminates the random access procedure.

Figure 19B:
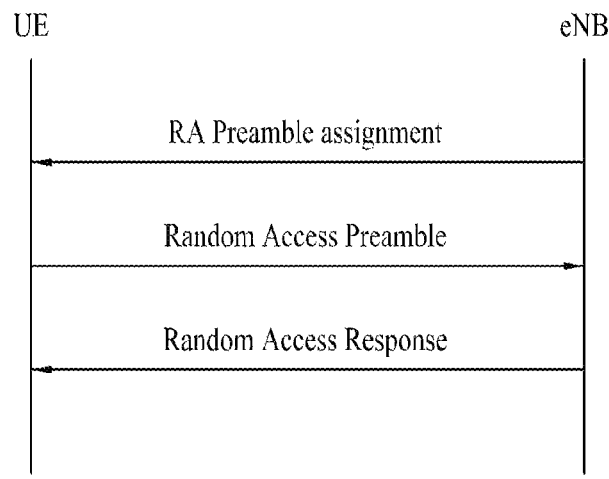
FIG. 19B illustrates a non-contention-based random access procedure to which the present invention may be applied.

Next, FIG. 19B illustrates how a UE and an eNB operate in a non-contention-based random access procedure.

The non-contention-based random access procedure may be performed, first, when a handover procedure is performed and, second, when the non-contention-based random access procedure is requested by an instruction from an eNB. Of course, a contention-based random access procedure may also be performed in the two cases.

First, for the non-contention-based random access procedure, it is important to receive a designated random access preamble which is not likely to cause collision (or contention). Methods of indicating the random access preamble include using a handover command and using a PDCCH command.

After a random access preamble designated only for the UE is allocated from the eNB, the UE transmits the random access preamble to the eNB.

Here, random access response information is received using the same method as in the contention-based random access procedure.

In addition, a detailed method for resolving contention in a random access procedure is described below. Collision (or contention) occurs in the random access procedure basically because the number of random access preambles is limited.

That is, since the eNB cannot assign UE-specific random access preambles to all UEs, the UE randomly selects and transmits a random access preamble among common random access preambles. Accordingly, two or more UEs may select and transmit the same random access preamble through the same PRACH resources. However, in this case, the eNB determines that one random access preamble has been transmitted from one UE.

Therefore, the eNB transmits a random access response to the UE and predicts that the random access response will be received by one UE. However, contention may occur as described above such that two or more UEs receive one random access response and thus each UE performs operation based on the received random access response.

That is, there may be a problem in that two or more UEs transmit different data through the same radio resources using one UL grant included in the random access response. Thus, all data may fail to be transmitted to the eNB, or the eNB may receive data of only a specific UE depending on the position or transmission power of each UE.

In the latter case, since the two or more UEs assume that they have successfully transmitted their own data, the eNB needs to notify the UEs, which have failed in contention, of the information regarding failure.

Notification of the information regarding failure or success is referred to as contention resolution. There are two contention resolution methods, one method using a Contention Resolution (CR) timer and the other method transmitting the identifier of the UE, which has succeeded in contention, to the UEs.

The former method is used when the UE already has a unique cell identifier (C-RNTI) before the random access procedure is performed.

That is, the UE which already has the cell identifier transmits data including the cell identifier to the eNB in response to the random access response and starts the CR timer. Then, when the UE has received PDCCH information including the cell identifier of the UE before the CR timer expires, the UE determines that the UE has succeeded in contention and normally terminates the random access procedure. On the other hand, when the UE has not received a PDCCH including the cell identifier of the UE before the CR timer expires, the UE determines that the UE has failed in contention and thus again performs the random access procedure or reports failure to a higher layer.

The latter contention resolution method, in which an identifier of a UE which has succeeded in contention resolution is transmitted, is used when the UE has no unique cell identifier before the random access procedure. That is, when the UE has no cell identifier, the UE transmits data including a higher-level identifier (S-TMSI or random Id) than the cell identifier according to UL grant information included in the random access response and starts a CR timer.

When data including the higher-level identifier of the UE has been received before the CR timer expires, the UE determines that the random access procedure has been successful. On the other hand, when data including the higher-level identifier of the UE has not been received before the CR timer expires, the UE determines that the random access procedure has failed.

The methods suggested in this specification may be used to configure a connection relation for random access of the UE.

For example, after a UE transmits a random access preamble through uplink of a specific CC, the UE may designate a downlink CC through which the UE expects to receive a random access response transmitted from the eNB as a response to the random access preamble. It is preferable that a connection relation for random access be pre-set by the eNB before the UE performs random access.

In addition, the methods of the present invention may be applied to configure a connection relation for time synchronization adjustment of a UE and an eNB.

Before describing how the present invention is applied to configure such a connection relation, timing alignment maintenance of an uplink in the LTE system is described as follows.

In an LTE system, which is based on Orthogonal Frequency Division Multiplexing (OFDM) technology, data transmission of a specific UE may cause interference to communication with an eNB of other UEs. To minimize such interference, the eNB needs to properly manage transmission timing of the UE.

More specifically, each UE may be present in any area in a cell. This indicates that the time required for data transmitted by each UE to arrive at an eNB may vary depending on the location of the UE. That is, the time required for data transmitted by a UE, which attempts transmission at an edge of a cell, to arrive at the eNB will be longer than the time required for data transmitted by a UE which is located at the center of a cell to arrive at the eNB. That is, the time required for data transmitted by a UE, which is located at the center of a cell, to arrive at the eNB will be shorter than the time required for data transmitted by a UE which is located at an edge of a cell to arrive at the eNB.

An eNB needs to perform management to allow data or signals transmitted by all UEs in a cell to be received within every time boundary in order to prevent the influence of interference. Therefore, the eNB needs to appropriately control transmission timing of each UE according to the position or situation of the UE. Such transmission timing control is referred to as time synchronization management.

One method of managing time synchronization may be a random access operation. That is, the eNB receives a random access preamble transmitted by a UE through a random access procedure and calculates a time synchronization value associated with transmission timing using received information of the random access preamble.

The eNB then notifies the UE of the calculated time synchronization value through a random access response and the UE then updates transmission timing using the calculated time synchronization value. In another method, the eNB receives a sounding reference signal that the UE periodically or randomly transmits, and calculates a time synchronization value of the UE through the received signal and then notifies the UE of the calculated time synchronization value.

Accordingly, the eNB instructs the UE to finely control uplink transmission timing in order to allow the UE to transmit data at a correct timing through a specific uplink such that the UE and the eNB can maintain correct synchronization.

This instruction is referred to as timing advance in LTE. Through timing advance, it is possible to slightly delay or advance the uplink transmission timing of the UE. The UE applies a received timing advance value in the form of an offset with respect to used downlink carrier timing and determines uplink timing.

Returning to the description of the method of the present invention, when the UE determines transmission timing through a specific uplink CC, the eNB may designate a downlink CC that the UE needs to use as a reference. Here, it is preferable that a connection relation of the UE and the eNB for time synchronization is pre-set by the eNB before the UE performs random access.

The following is a description of a UE and an eNB for modifying a connection relation between CCs for data communication of the UE according to another aspect of the present invention.

Figure 20:
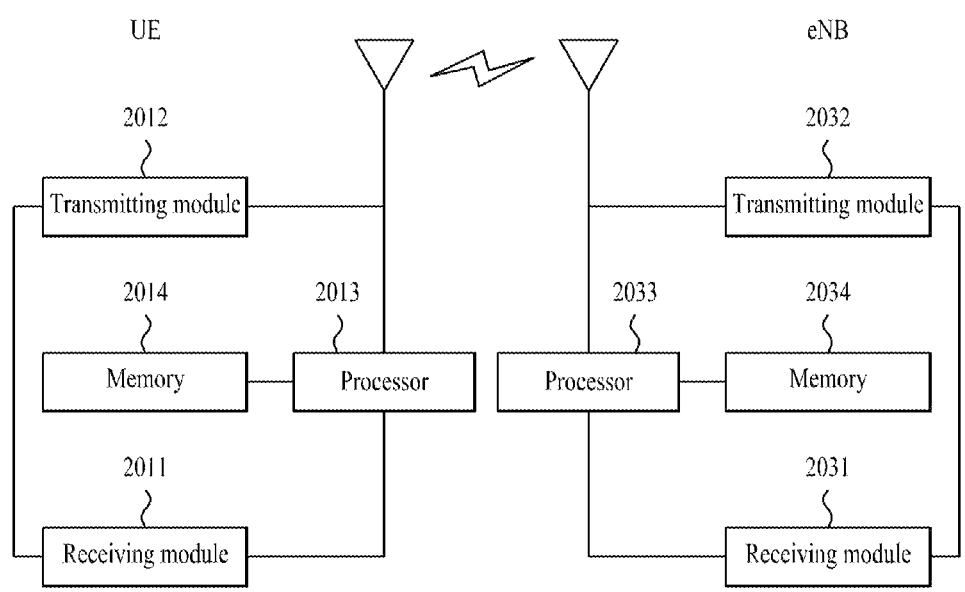
FIG. 20 illustrates a configuration of an embodiment of a wireless communication system including a UE and an eNB according to the present invention.

FIG. 20 illustrates a configuration of an embodiment of a wireless communication system including a UE and an eNB according to the present invention.

As shown in FIG. 20, the UE may include a receiving module 2011, a transmitting module 2012, a processor 2013, and a memory 2014. The receiving module 2011 may receive various signals, data, information, etc., from the eNB or the like. The transmitting module 2012 may transmit various signals, data, information, etc., to the eNB or the like. The processor 2013 may control communication of data through a message received through the receiving module 2011. The UE may be configured such that, when the UE receives a message including identifier information for modifying a connection relation between downlink and uplink CCs from the eNB through the receiving module and receives specific data through the downlink CC, the UE transmits feedback information for the received data to the eNB through the transmitting module using the uplink CC modified based on the identifier information.

Meanwhile, the eNB may include a receiving module 2031, a transmitting module 2032, a processor 2033, and a memory 2034. The receiving module 2031 may receive various signals, data, information, etc., from the UE or the like. The transmitting module 2032 may transmit various signals, data, information, etc., to the UE or the like.

The processor 2033 may perform a control operation to transmit configuration information of a specific CC among a plurality of CCs to the UE through the transmitting module 2032. In addition, the processor 2033 performs arithmetic processing on information received by the UE, information to be transmitted to the outside, or the like and the memory 2034 may store the arithmetic-processed information or the like for a certain time and may be replaced with a component such as a buffer (not shown).

The following is a detailed description of configurations of the processors of the UE and the eNB, which are core components of the UE and the eNB.

Figure 21:
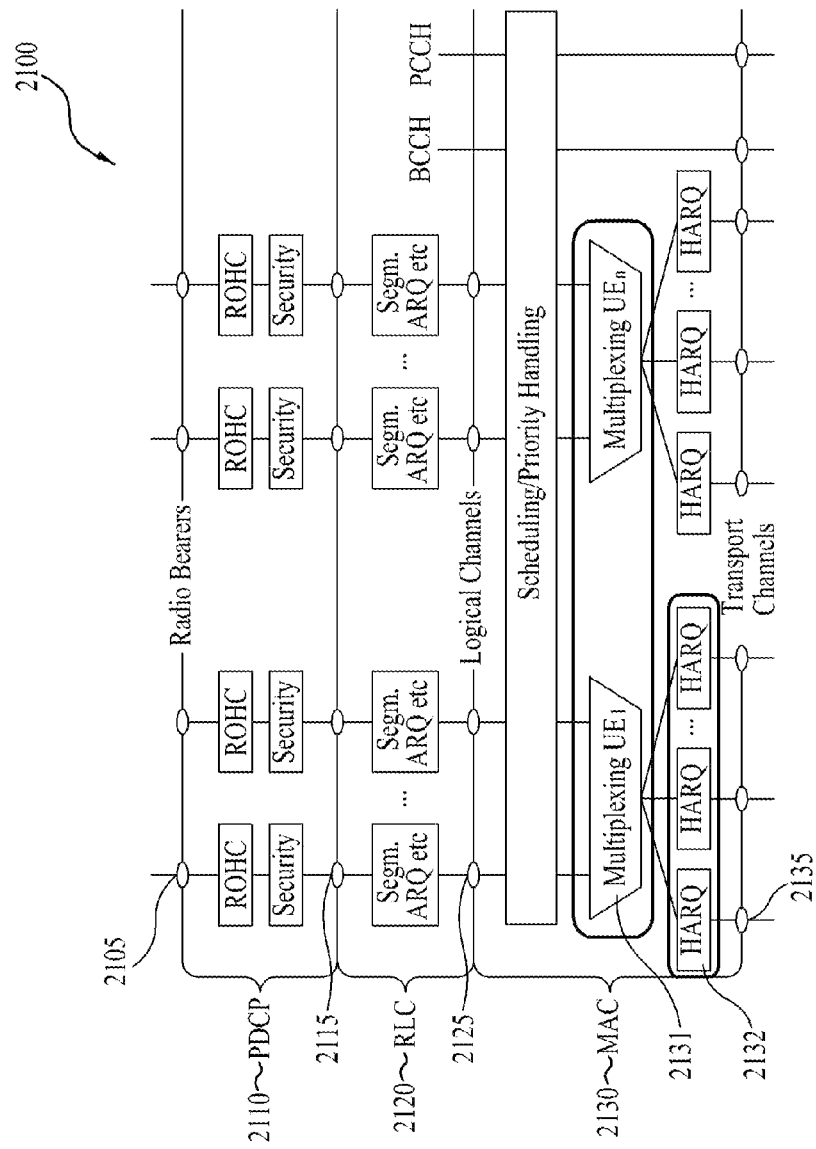
FIG. 21 illustrates functions (especially, associated with a structure of an L2 (second) layer) of the processor of the eNB to which the embodiments of the present invention are applied.
Figure 22:
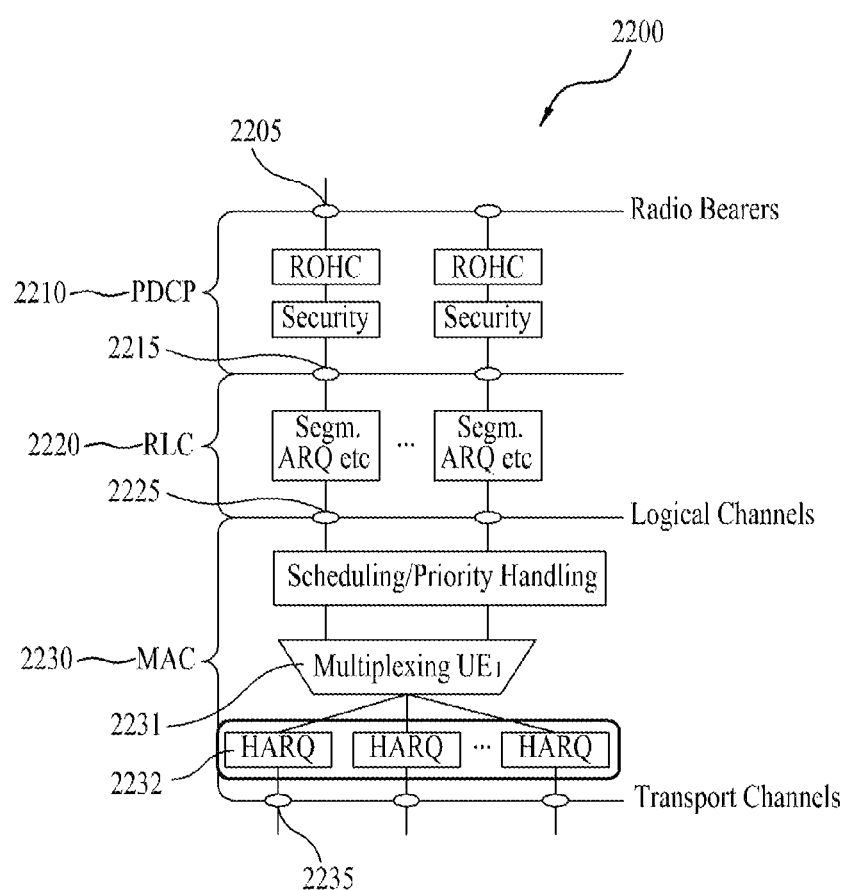
FIG. 22 illustrates functions (especially, associated with a structure of an L2 (second) layer) of the processor of the UE to which the embodiments of the present invention are applied.

FIG. 21 illustrates functions (especially, associated with a structure of an L2 (second) layer) of the processor of the eNB to which the embodiments of the present invention are applied and FIG. 22 illustrates functions (especially, associated with a structure of an L2 (second) layer) of the processor of the UE to which the embodiments of the present invention are applied.

A PDCP layer 2110, an RLC layer 2120, and a MAC layer 2130 are illustrated in a downlink L2 structure 2100 shown in FIG. 21. In FIG. 21, elements 2105, 2115, 2125, and 2135 denoted by circles on interfaces between the layers represent Service Access Points (SAP) for pear-to-pear communication. The SAP between a PHY channel (not shown) and the MAC layer provides a transport channel as denoted by "2135" and the SAP between the MAC layer and the RLC layer provides a logical channel as denoted by "2125". General operations of the layers are the same as described above.

The MAC layer multiplexes a plurality of logical channels (i.e., radio bearers) from the RLC layer. In the downlink L2 structure, a plurality of multiplexing entities 2131 of the MAC layer are associated with Multiple Input Multiple Output (MIMO) technology. In a system where carrier aggregation (CA) technology is not taken into consideration, in the case of non-MIMO, multiple logical channels are multiplexed to generate one transport channel and therefore one Hybrid Automatic Repeat and reQuest (HARQ) Entity (not shown) is provided for one multiplexing entity 2131.

On the other hand, the processor of the eNB where CA technology is taken into consideration generates a plurality of transport channels corresponding to a plurality of CCs from one multiplexing entity 2131. In this regard, in CA technology, one HARQ entity 2032 manages one CC. Accordingly, in the MAC layer 2130 of the processor of the eNB that supports CA technology, a plurality of HARQ entities 2132 are provided for one multiplexing entity 2131 and operations associated with the plurality of HARQ entities 2132 are performed in the MAC layer 2130. In addition, since each HARQ entity 2132 independently processes a transport block, it is possible to simultaneously transmit and receive a plurality of transport blocks through a plurality of CCs.

The uplink L2 structure 2200 of FIG. 22, i.e., the L2 structure of the processor of the UE, performs the same operations as the downlink L2 structure 2100 of FIG. 21 except that one multiplexing entity 2231 is included in one MAC layer 2230. That is, a plurality of HARQ entities 2232 are provided for a plurality of CCs, operations associated with a plurality of HARQ entities 2232 are performed in the MAC layer 2230, and a plurality of transport blocks can be simultaneously transmitted and received through a plurality of CCs.

The embodiments of the present invention described above may be implemented by various means. For example, the embodiments of the present invention may be implemented by hardware, firmware, software, or any combination thereof.

In the case in which the present invention is implemented with hardware, the methods according to the embodiments of the present invention may be implemented with one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, or the like.

Although the present invention has been described above with reference to each of the embodiments, it will be understood by a person having ordinary skills in the art that the embodiments may be combined in various ways to be practiced. Thus, it should be understood that the present invention includes all embodiments within the scope of the appended claims without being limited to the above embodiments.

INDUSTRIAL APPLICABILITY

Although each of the embodiments of the present invention has been described focusing on the case in which the present invention is applied to a mobile communication system that is based on 3GPP LTE for ease of explanation, the present invention can be applied in the same manner to various other mobile communication systems in which a measurement operation for mobility management of a UE is used and a UE can simultaneously use a plurality of CCs.

The invention claimed is:

1. A method for configuring component carriers at a user equipment in a mobile communication system supporting carrier aggregation, the method comprising:
   receiving a message including configuration information for a first component carrier; and
   modifying configuration of the component carriers according to the configuration information,
   wherein the configuration information includes identification information of a second component carrier, and
   wherein the identification information indicates an association between the first component carrier and the second component carrier.

2. The method of claim 1, wherein the message includes information for reconfiguring radio resource control (RRC) connection of the user equipment.

3. The method of claim 1, wherein downlink of the first component carrier is associated with uplink of the second component carrier.

4. The method of claim 1, wherein uplink of the first component carrier is associated with downlink of the second component carrier.

5. The method of claim 1, wherein the identification information indicates that downlink of the second component carrier is used to measure path loss for uplink of the first component carrier.

6. A communication device configuring component carriers in a mobile communication system supporting carrier aggregation, the communication device comprising:
a receiving module; and
a processor configured to:
receive a message including configuration information for a first component carrier, and
modify configuration of the component carriers according to the configuration information,
wherein the configuration information includes identification information of a second component carrier, and
wherein the first component carrier is associated with the second component carrier according to the identification information.

7. The communication device of claim 6, wherein the message includes information for reconfiguring radio resource control (RRC) connection of the user equipment.

8. The communication device of claim 6, wherein downlink of the first component carrier is associated with uplink of the second component carrier.

9. The communication device of claim 6, wherein uplink of the first component carrier is associated with downlink of the second component carrier.

10. The communication device of claim 6, wherein the identification information indicates that downlink of the second component carrier is used to measure path loss for uplink of the first component carrier.

* * * * *